US011959500B2

(12) United States Patent
Takakuwa et al.

(10) Patent No.: US 11,959,500 B2
(45) **Date of Patent: *Apr. 16, 2024**

(54) AIR CYLINDER, HEAD COVER, AND ROD COVER

(71) Applicant: SMC CORPORATION, Chiyoda-ku (JP)

(72) Inventors: Youji Takakuwa, Kitakatsushika-gun (JP); Akihiro Kazama, Moriya (JP); Hiroyuki Asahara, Tsukuba (JP); Kengo Monden, Ushiku (JP)

(73) Assignee: SMC CORPORATION, Chiyoda-ku (JP)

( * ) Notice: Subject to any disclaimer, the term of this patent is extended or adjusted under 35 U.S.C. 154(b) by 5 days.

This patent is subject to a terminal disclaimer.

(21) Appl. No.: 17/640,498

(22) PCT Filed: Aug. 3, 2020

(86) PCT No.: PCT/JP2020/029599

§ 371 (c)(1),
(2) Date: Mar. 4, 2022

(87) PCT Pub. No.: WO2021/044780

PCT Pub. Date: Mar. 11, 2021

(65) Prior Publication Data

US 2022/0349426 A1 Nov. 3, 2022

(30) Foreign Application Priority Data

Sep. 6, 2019 (JP) ................................ 2019-162900

(51) Int. Cl.
*F15B 11/04* (2006.01)
*F15B 11/06* (2006.01)
(Continued)

(52) U.S. Cl.
CPC ...... *F15B 15/1433* (2013.01); *F15B 11/0413* (2013.01); *F15B 15/204* (2013.01);
(Continued)

(58) Field of Classification Search
CPC .... F15B 2211/8855; F15B 2211/40584; F15B 2211/40592; F15B 2211/755;
(Continued)

(56) References Cited

U.S. PATENT DOCUMENTS 3,202,060 A 8/1965 Grotness
3,430,540 A * 3/1969 Linz ..................... F15B 11/044 91/454

(Continued)

FOREIGN PATENT DOCUMENTS

JP 52-21399 U1 2/1977
JP 2002-130213 A 5/2002

(Continued)

OTHER PUBLICATIONS

International Search Report dated Oct. 13, 2020 in PCT/JP2020/029599 filed Aug. 3, 2020, 3 pages.

(Continued)

*Primary Examiner* — Kenneth Bomberg
*Assistant Examiner* — Michael Quandt
(74) *Attorney, Agent, or Firm* — Oblon, McClelland, Maier & Neustadt, L.L.P.

(57) ABSTRACT

The present invention pertains to an air cylinder (10) in which flow rate controllers (24, 24A) are built into a head cover (14) and a rod cover (16), said flow rate controllers (24, 24A) being provided with a first flow rate adjustment part (28) connected between a port (14*a*, 16*a*) and a cylinder chamber (12*c*), a second flow rate adjustment part (32) provided adjacent to the first flow rate adjustment part (28), and a pilot check valve (38) connected in series to the second
(Continued)

flow rate adjustment part (32). In response to the pressure of pilot air, the pilot check valve (38) switches between a state in which the passage of exhaust air from the cylinder chamber (12*c*) is permitted and a state in which the passage of exhaust air is prevented.

6 Claims, 13 Drawing Sheets

(51) Int. Cl.

*F15B 15/14* (2006.01)
*F15B 15/20* (2006.01)
*F15B 15/22* (2006.01)

(52) U.S. Cl.

CPC ............... *F15B 15/22* (2013.01); *F15B 11/06* (2013.01); *F15B 2211/30505* (2013.01); *F15B 2211/329* (2013.01); *F15B 2211/355* (2013.01); *F15B 2211/40515* (2013.01); *F15B 2211/40584* (2013.01); *F15B 2211/40592* (2013.01); *F15B 2211/7053* (2013.01); *F15B 2211/75* (2013.01); *F15B 2211/8855* (2013.01)

(58) Field of Classification Search

CPC ... F15B 2211/46; F15B 2211/75; F15B 11/06; F15B 11/064; F15B 15/22; F15B 15/204

See application file for complete search history.

(56) References Cited

U.S. PATENT DOCUMENTS 6,131,610 A * 10/2000 Morisako ................ F15B 13/01 137/601.19
6,745,789 B2 * 6/2004 Christiani ........... F15B 11/0413 91/420
2004/0112208 A1 6/2004 Kot, II

FOREIGN PATENT DOCUMENTS

JP 2009-115242 A 5/2009
JP 5578502 B2 8/2014

OTHER PUBLICATIONS

Extended European Search Report dated Jul. 7, 2023, in corresponding European Patent Application No. 20860012.2, 8 pages.

* cited by examiner

AIR CYLINDER, HEAD COVER, AND ROD COVER

TECHNICAL FIELD

The present invention relates to an air cylinder, a head cover, and a rod cover.

BACKGROUND ART

Conventionally, a shock absorbing mechanism has been used in which a cushioning material made of a soft resin such as rubber or urethane or the like, or an oil damper or the like is attached to an end part of an air cylinder, to thereby cushion an impact at a stroke end. However, such a shock absorbing mechanism that mechanically mitigates shocks in the cylinder is limited in terms of the number of operations it can perform, and requires regular maintenance.

In order to resolve such incompatibility, in JP 5578502 B2, a speed controller (flow rate controller) is disclosed in which, by throttling the exhaust air that is discharged from the air cylinder in the vicinity of a stroke end, an operating speed of the air cylinder is reduced.

SUMMARY OF THE INVENTION

However, such a conventional flow rate controller is an external component that is connected to ports of the air cylinder, which increases the number of component parts of the drive device of the air cylinder, and the device configuration of the drive device becomes complex. Further, the structure thereof is complicated, and a problem arises in that, when attempting to form the head cover and the rod cover integrally with the air cylinder, machining becomes difficult, and productivity is reduced.

The present invention has the object of providing an air cylinder, a head cover, and a rod cover, which enable the device configuration of a drive device to be simplified, and which are superior in terms of productivity.

One aspect of the present invention is an air cylinder, comprising a cylinder tube in which a cylinder chamber is formed, a head cover configured to close one end of the cylinder tube, a rod cover configured to close another end of the cylinder tube, a piston configured to slide in the cylinder chamber, a piston rod having one end connected to the piston, a port provided in each of the head cover and the rod cover, and a flow rate controller incorporated into at least one of the head cover or the rod cover, wherein the flow rate controller includes a first flow path configured to allow communication between the port and the cylinder chamber, a first flow rate adjustment part disposed in the first flow path, a second flow path disposed in parallel with the first flow path, a second flow rate adjustment part disposed in the second flow path, a pilot check valve disposed in series with the second flow rate adjustment part in the second flow path, and a third flow rate adjustment part configured to supply and discharge pilot air to and from the pilot check valve, and wherein, depending on a pressure of the pilot air, the pilot check valve switches between a state allowing passage of exhaust air discharged from the cylinder chamber, and a state preventing the passage of the exhaust air.

Another aspect of the present invention is a head cover for an air cylinder that covers a head side end part of a cylinder tube, the head cover comprising, a port, a first flow path configured to communicate with the port and a cylinder chamber of the air cylinder, a first flow rate adjustment part disposed in the first flow path, a second flow path disposed in parallel with the first flow path, a second flow rate adjustment part disposed in the second flow path, a pilot check valve disposed in the second flow path, and connected in series with the second flow rate adjustment part, and a third flow rate adjustment part configured to supply and discharge pilot air to and from the pilot check valve, wherein, depending on a pressure of the pilot air, the pilot check valve switches between a state allowing passage of exhaust air discharged from the cylinder chamber, and a state preventing the passage of the exhaust air.

Another further aspect of the present invention is a rod cover for an air cylinder that covers a rod side end part of a cylinder tube, the rod cover comprising, a port, a first flow path configured to communicate with the port and a cylinder chamber of the air cylinder, a first flow rate adjustment part disposed in the first flow path, a second flow path disposed in parallel with the first flow path, a second flow rate adjustment part disposed in the second flow path, a pilot check valve disposed in the second flow path, and connected in series with the second flow rate adjustment part, and a third flow rate adjustment part configured to supply and discharge pilot air to and from the pilot check valve, wherein, depending on a pressure of the pilot air, the pilot check valve switches between a state allowing passage of exhaust air discharged from the cylinder chamber, and a state preventing the passage of the exhaust air.

In accordance with the air cylinder, the head cover, and the rod cover according to the above-described aspects, the device configuration of the drive device can be simplified, and because the structure thereof is simplified, productivity is superior.

DESCRIPTION OF THE INVENTION

Hereinafter, a preferred embodiment of the present invention will be presented and described in detail below with reference to the accompanying drawings.

Figure 1:
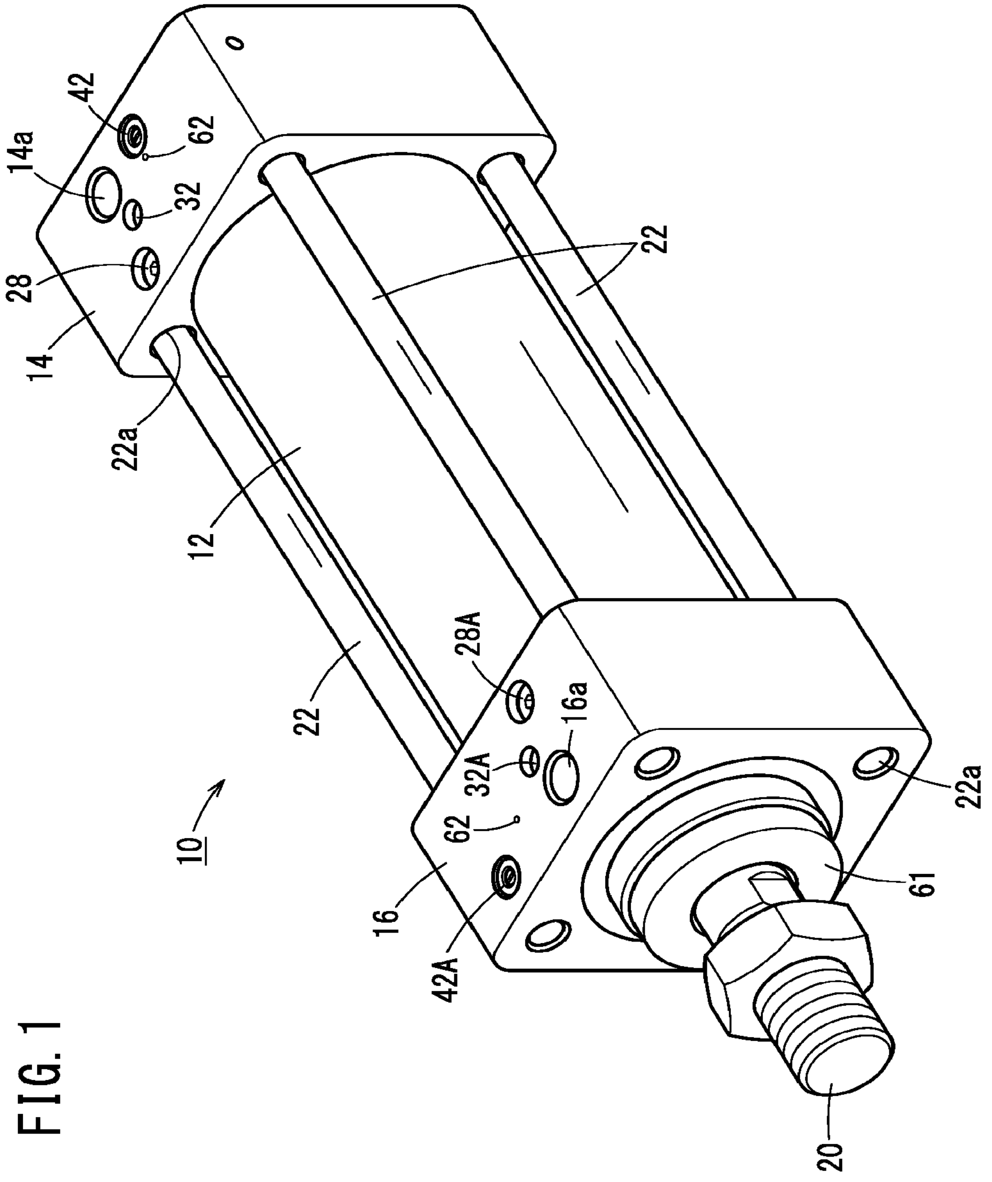
FIG. 1 is a perspective view of an air cylinder according to an embodiment of the present invention.

As shown in FIG. 1, an air cylinder 10 is a double acting cylinder that is used in an automated equipment line or the like. The air cylinder 10 is equipped with a cylindrical cylinder tube 12, a head cover 14 that seals a head side end part of the cylinder tube 12, and a rod cover 16 that seals a rod side end part of the cylinder tube 12. The cylinder tube 12, the head cover 14, and the rod cover 16 are connected in an axial direction by a plurality of connecting rods 22.

Figure 2:
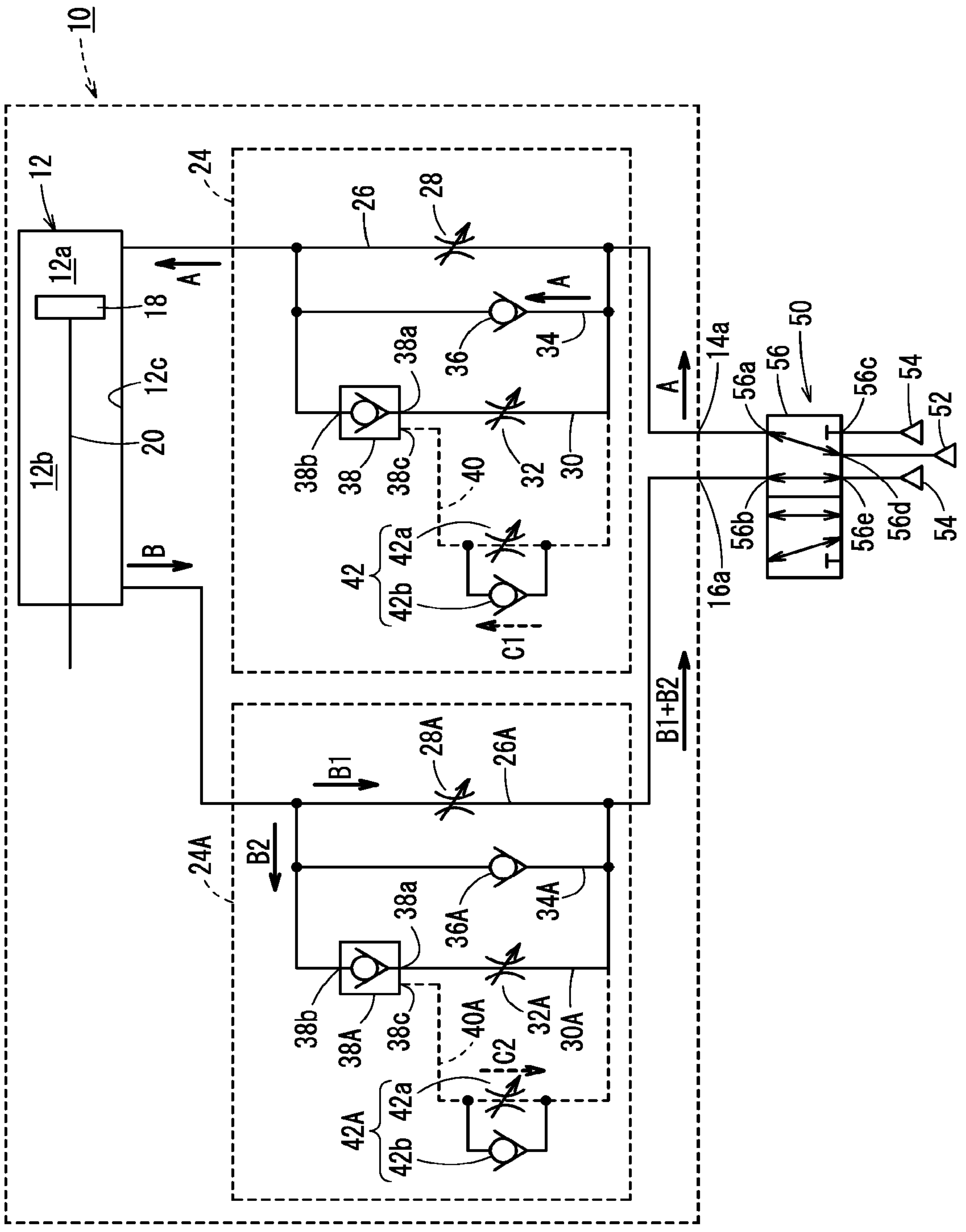
FIG. 2 is a fluid circuit diagram of the air cylinder shown in FIG. 1, and a drive device thereof.

As shown in FIG. 2, in the interior of the cylinder tube 12, there are provided a piston 18 that partitions a cylinder chamber 12*c*, and a piston rod 20 connected to the piston 18. A head side flow rate controller 24 is connected to a head side pressure chamber 12*a* of the piston 18, and a rod side flow rate controller 24A is connected to a rod side pressure chamber 12*b* of the piston 18. The flow rate controller 24 is incorporated into the head cover 14, and is connected to a head side port 14*a*. The flow rate controller 24A is incorporated into the rod cover 16, and is connected to a rod side port 16*a*.

The head side flow rate controller 24 includes a first flow path 26 connecting the head side port 14*a* and the cylinder chamber 12*c*, and a second flow path 30 disposed in parallel with the first flow path 26. A first flow rate adjustment part 28 is provided in the first flow path 26. The first flow rate adjustment part 28 is made up of a throttle valve that variably throttles the flow rate of air passing through the first flow path 26, and by primarily throttling the flow rate of exhaust air, suppresses an operating speed of the piston 18 in the vicinity of the stroke end.

A second flow rate adjustment part 32, and a pilot check valve 38 are provided in the second flow path 30. The second flow rate adjustment part 32 is a throttle valve, and can variably adjust the flow rate of air passing through the second flow path 30. The pilot check valve 38 is a check valve through which the passage of exhaust air is switched depending on the pressure of the pilot air, and includes an inlet 38*a*, an outlet 38*b*, and a pilot port 38*c*. The inlet 38*a* is connected to the head side port 14*a* side of the second flow path 30, and the outlet 38*b* is connected to the cylinder chamber 12*c* side of the second flow path 30. When the pressure of the pilot air falls below a predetermined value, the pilot check valve 38 operates as a check valve that allows air to pass from the inlet 38*a* toward the outlet 38*b*, while preventing the passage of air in the opposite direction. Further, when the pressure of the pilot air becomes greater than or equal to the predetermined value, the pilot check valve 38 allows the air to pass in both directions from the inlet 38*a* toward the outlet 38*b*, and vice versa.

The flow rate controller 24 further includes a third flow path 34 connecting the head side port 14*a* and the cylinder chamber 12*c*, and a pilot air flow path 40 connecting the head side port 14*a* and the pilot port 38*c* of the pilot check valve 38. A check valve 36 is disposed in the third flow path 34. The check valve 36 is connected in a direction that allows passage of air flowing from the head side port 14*a* toward the cylinder chamber 12*c*, while preventing the passage of air in the opposite direction. The third flow path 34 and the check valve 36 allow high pressure air to pass freely toward the cylinder chamber 12*c*. The third flow path 34 and the check valve 36 need not necessarily be provided independently as shown in the drawings, but may be an integrated member with the throttle valve of the first flow rate adjustment part 28 or the throttle valve of the second flow rate adjustment part 32, in the form of a check valve equipped throttle valve.

A third flow rate adjustment part 42, which is capable of variably adjusting the flow rate of the pilot air supplied to and discharged from the pilot check valve 38, is provided in the pilot air flow path 40. The third flow rate adjustment part 42 includes a throttle valve 42*a*, and a check valve 42*b* which is connected in parallel with the throttle valve 42*a*. The check valve 42*b* is connected in a direction that allows air to pass from the head side port 14*a* toward the pilot check valve 38, while preventing the passage of air in the opposite direction, and quickly supplies the pilot air to the pilot check valve 38. The throttle valve 42*a* is capable of variably adjusting the flow rate of the pilot air discharged through the pilot air flow path 40, and determines a timing at which the operation of the pilot check valve 38 is switched. The third flow rate adjustment part 42 can be configured in the form of a check valve equipped throttle valve in which the throttle valve 42*a* and the check valve 42*b* are integrated.

The head side flow rate controller 24 is configured in the manner described above. On the other hand, since the rod side flow rate controller 24A is configured in substantially the same manner as the head side flow rate controller 24, constituent elements thereof which are the same as those of the head side flow rate controller 24 are designated by the same reference numerals, and detailed description thereof is omitted. However, the constituent elements of the rod side flow rate controller 24A are indicated by appending the letter "A" at the end of each of the reference numerals, in order to distinguish them from the constituent elements of the head side flow rate controller 24.

Hereinafter, a description will be given concerning a specific configuration of the head cover 14 and the rod cover 16 in which the flow rate controllers 24 and 24A are incorporated.

Figure 3A:
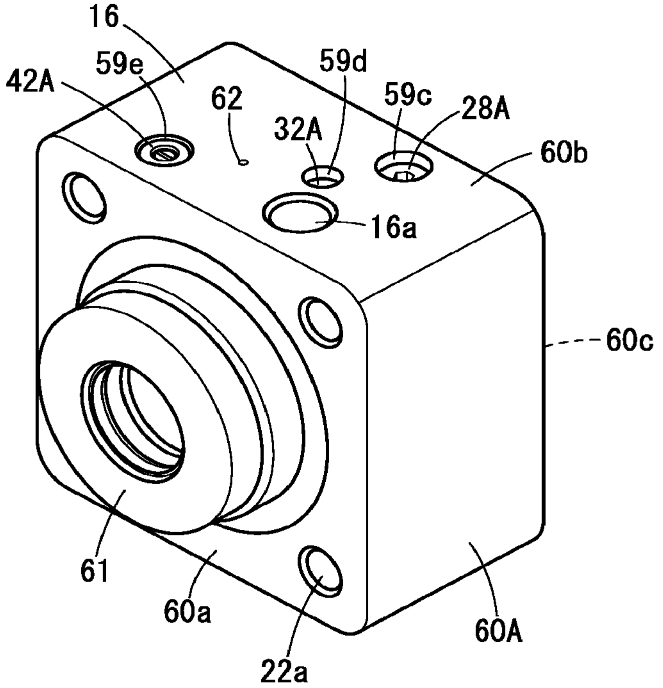
FIG. 3A is a perspective view of a rod cover shown in FIG. 1.

As shown in FIG. 3A, the rod cover 16 includes a main body portion 60A formed in the shape of a flat rectangular parallelepiped. An insertion member 61 through which the piston rod 20 is inserted is provided at a central part of an outer end surface 60*a* of the main body portion 60A, and connecting holes 22*a* for fixing the connecting rods 22 are provided at the four corners of the outer end surface 60*a* of the main body portion 60A. The connecting holes 22*a* extend in the axial direction of the piston rod 20 and penetrate through the main body portion 60A. The throttle valves, which constitute a first flow rate adjustment part 28A, a second flow rate adjustment part 32A, and a third flow rate adjustment part 42A, are provided together with the rod side port 16*a* on an upper surface 60*b* of the rod cover 16.

Figure 3B:
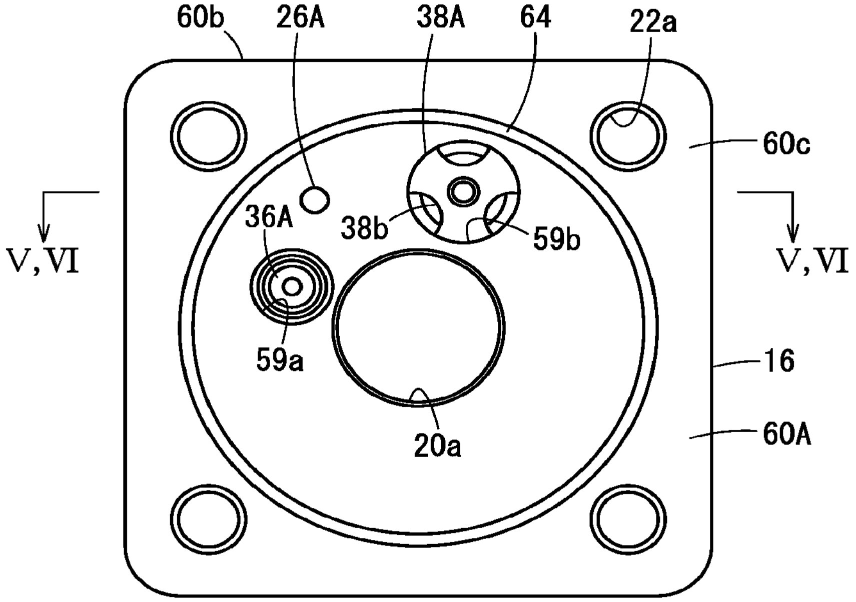
FIG. 3B is a side view of a cylinder tube side of the rod cover shown in FIG. 3A.

As shown in FIG. 3B, an annular shaped cylinder tube mounting groove 64 in which the cylinder tube 12 is mounted is provided on an inner end surface 60*c* of the main body portion 60A of the rod cover 16, and an inner side of the cylinder tube mounting groove 64 faces an inner side of the rod side pressure chamber 12*b*. An insertion hole 20*a* through which the piston rod 20 is inserted is formed in a central portion of the cylinder tube mounting groove 64, and a first flow path 26A and valve holes 59*a* and 59*b* open circumferentially around the piston rod 20. A check valve 36A is mounted in the valve hole 59*a*, and a pilot check valve 38A is mounted in the valve hole 59*b*.

Figure 4:
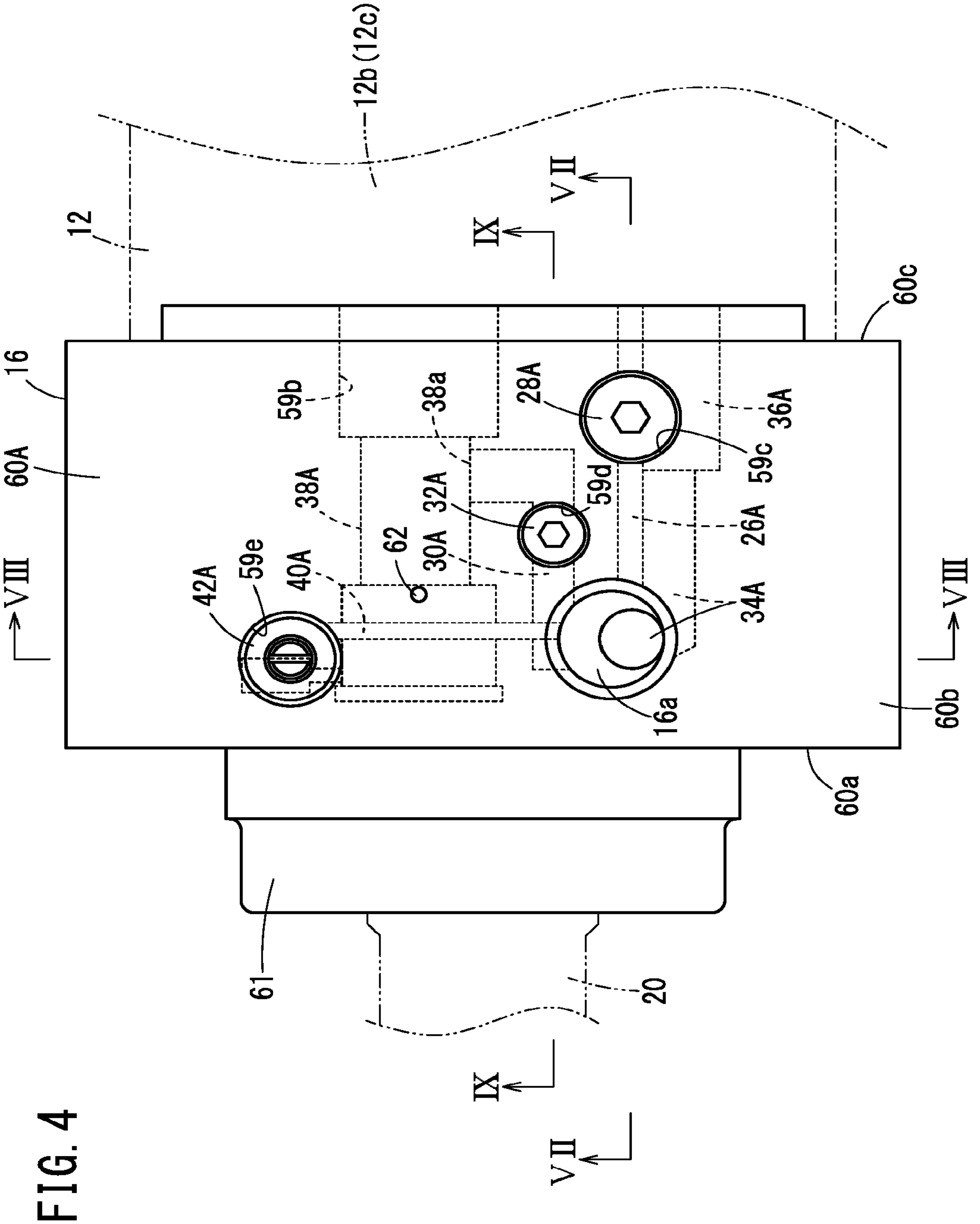
FIG. 4 is a plan view of the rod cover shown in FIG. 3A.

As shown in FIG. 4, the first flow rate adjustment part 28A and the second flow rate adjustment part 32A are arranged on the cylinder tube 12 side of the rod side port 16*a*, and the third flow rate adjustment part 42A is arranged on the lateral side of the rod side port 16*a*. Further, the pilot check valve 38A is disposed in the interior of the main body portion 60A between the rod side port 16*a* and the third flow rate adjustment part 42A.

Figure 7:
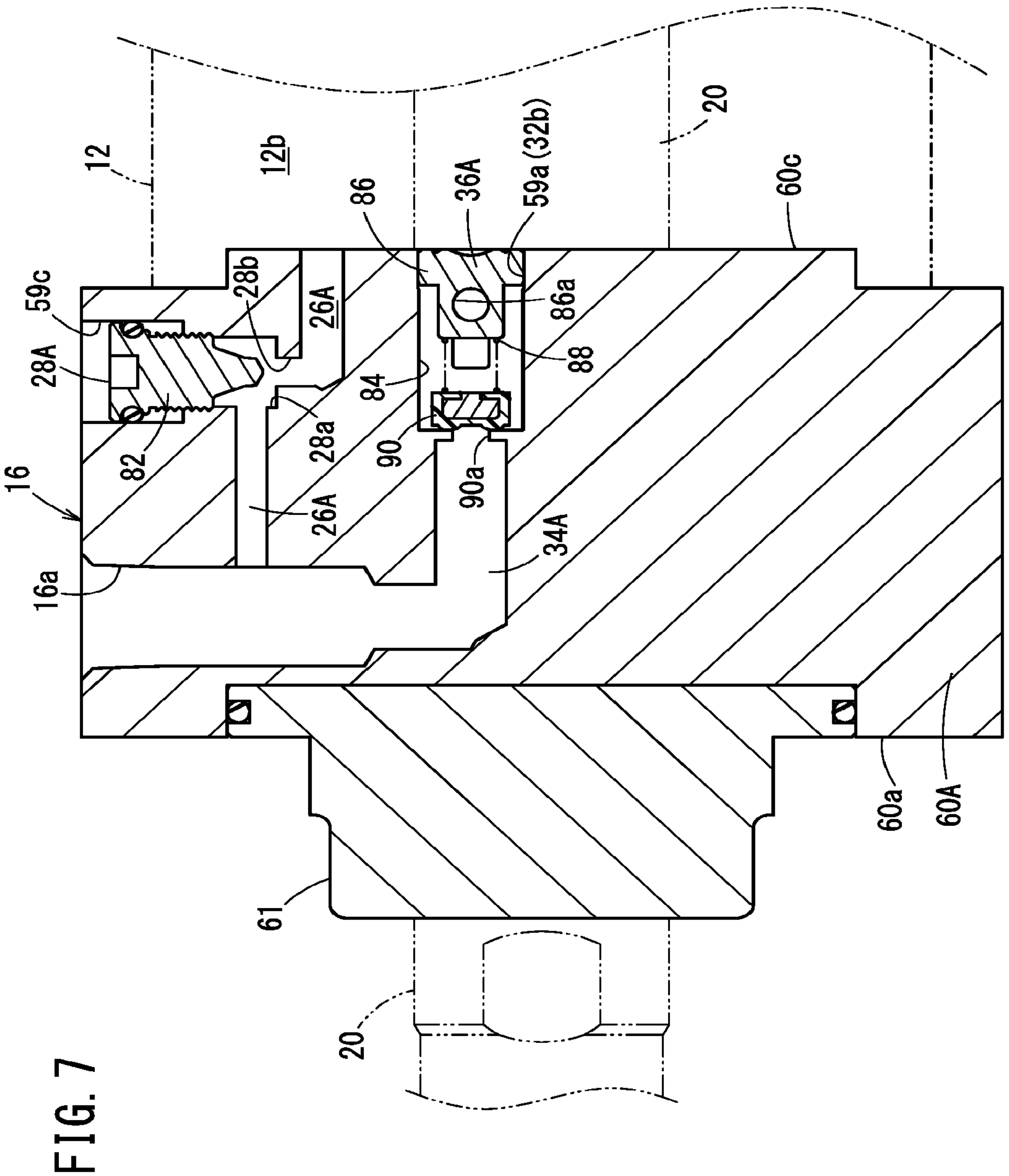
FIG. 7 is a cross-sectional view taken along line VII-VII of FIG. 4.

Ends of the first flow path 26A, a second flow path 30A, a third flow path 34A, and a pilot air flow path 40A open, respectively, at the rod side port 16*a*. As shown in FIG. 7, the first flow path 26A opens on a side portion of the rod side port 16*a*, and extends toward an inlet 28*a* of the first flow rate adjustment part 28A. The first flow rate adjustment part 28A is a throttle valve provided in a valve hole 59*c*, and includes a needle 82 that variably closes a flow path between the inlet 28*a* that opens on a side portion of the valve hole 59*c* and an outlet 28*b* that opens on a bottom portion of the valve hole 59*c*. The needle 82 is fixed in the valve hole 59*c* by a screw mechanism, and when the needle 82 is rotated and the needle 82 is made to project toward the outlet 28*b*, the flow path is narrowed. A portion of the first flow path 26A on the outlet side extends toward and opens on the inner end surface 60*c*.

Figure 6:
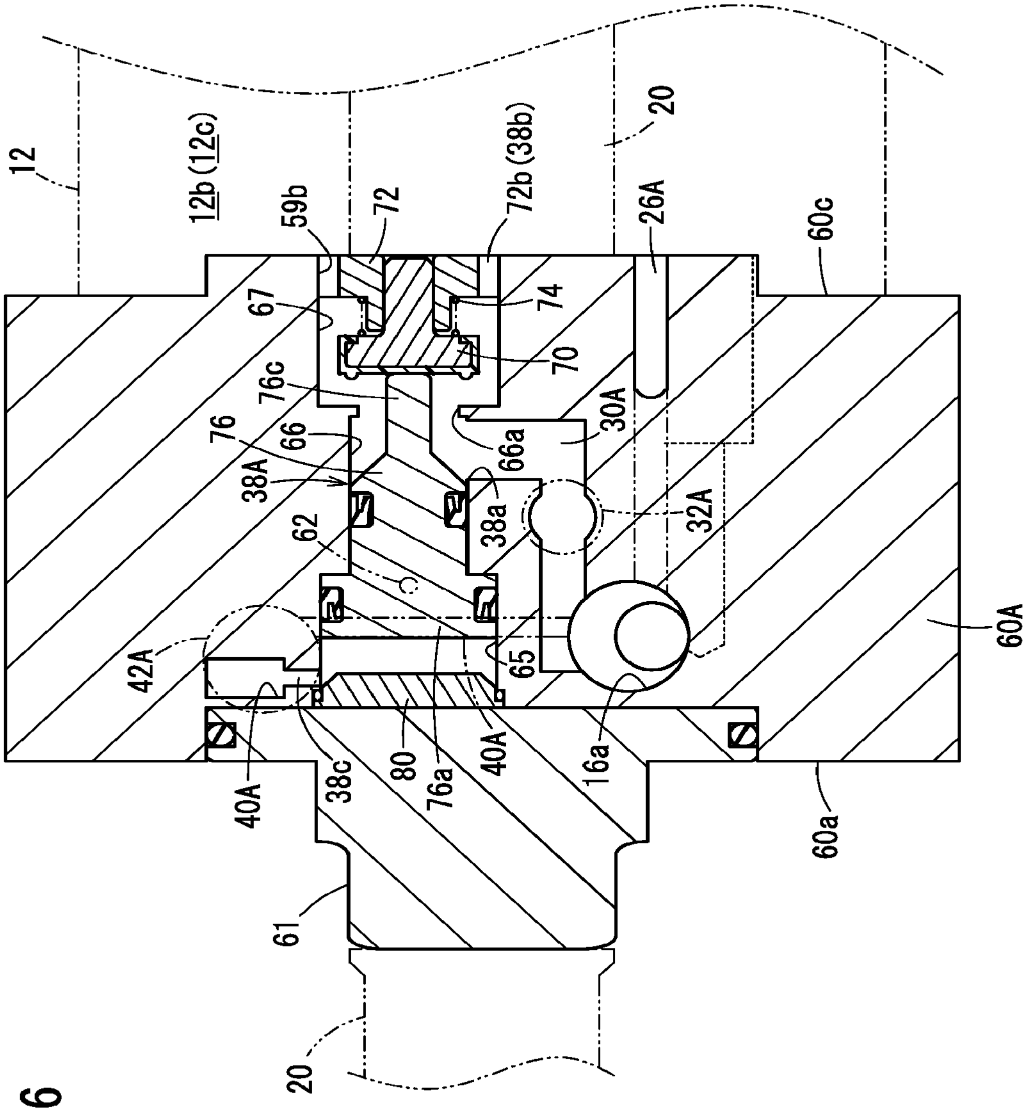
FIG. 6 is a cross-sectional view taken along line VI-VI of FIG. 3B, showing a state in which a pilot check valve shown in FIG. 5 is opened by a pilot pressure.
Figure 9:
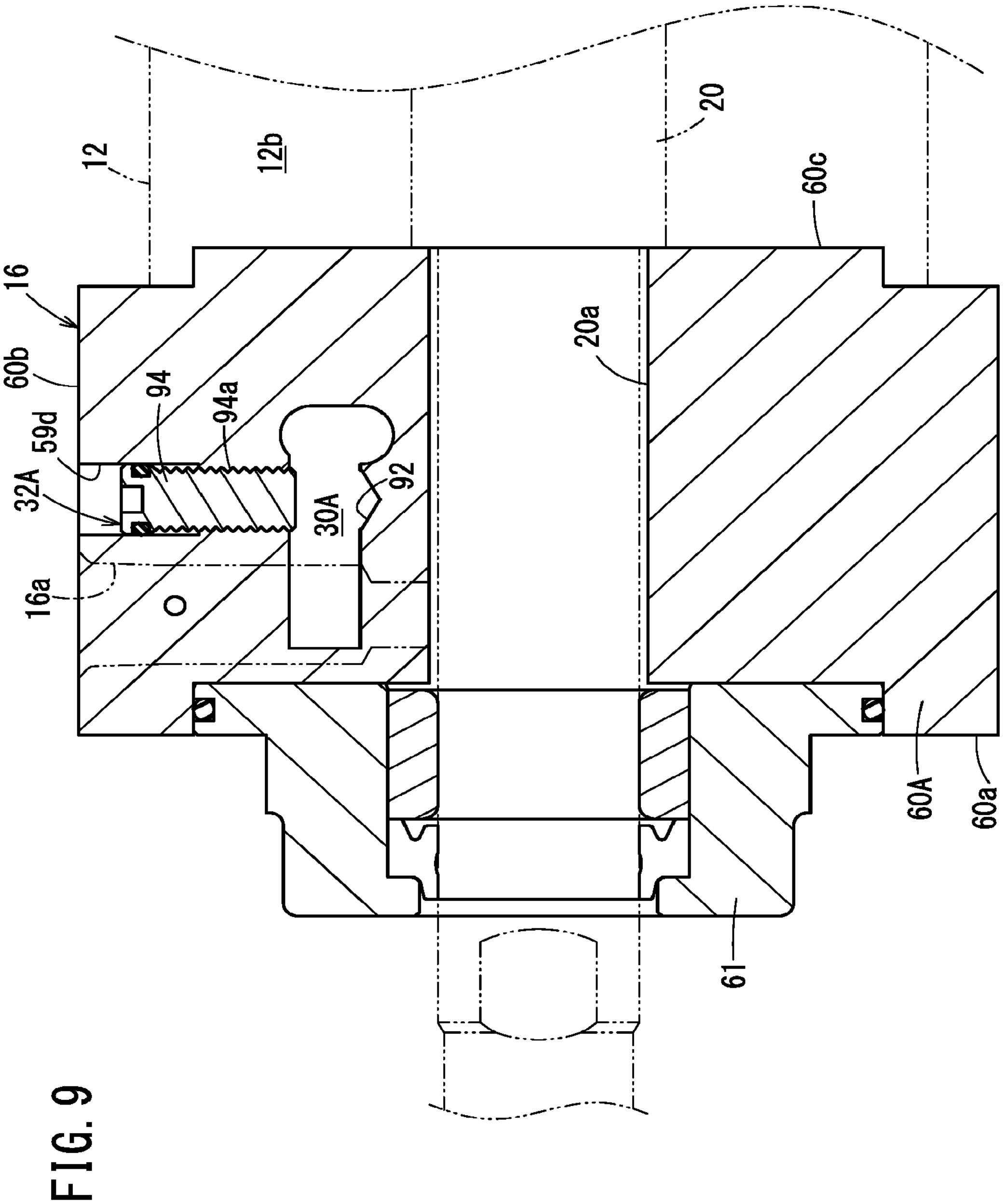
FIG. 9 is a cross-sectional view taken along line IX-IX of FIG. 4.

As shown in FIG. 6, the second flow path 30A is connected via the second flow rate adjustment part 32A to an inlet 38*a* of the pilot check valve 38A. As shown in FIG. 9, the second flow rate adjustment part 32A includes a valve main body 94 provided in a valve hole 59*d* that opens on the upper surface 60*b* and communicates with the second flow path 30A. The valve main body 94 is mounted in the valve hole 59*d* by a screw mechanism 94*a*, and by rotating the valve main body 94, the valve main body 94 is made to project toward the second flow path 30A, or alternatively, the valve main body 94 is made to retract away from the second flow path 30A, whereby the flow rate of the second flow path 30A can be variably adjusted.

Figure 8:
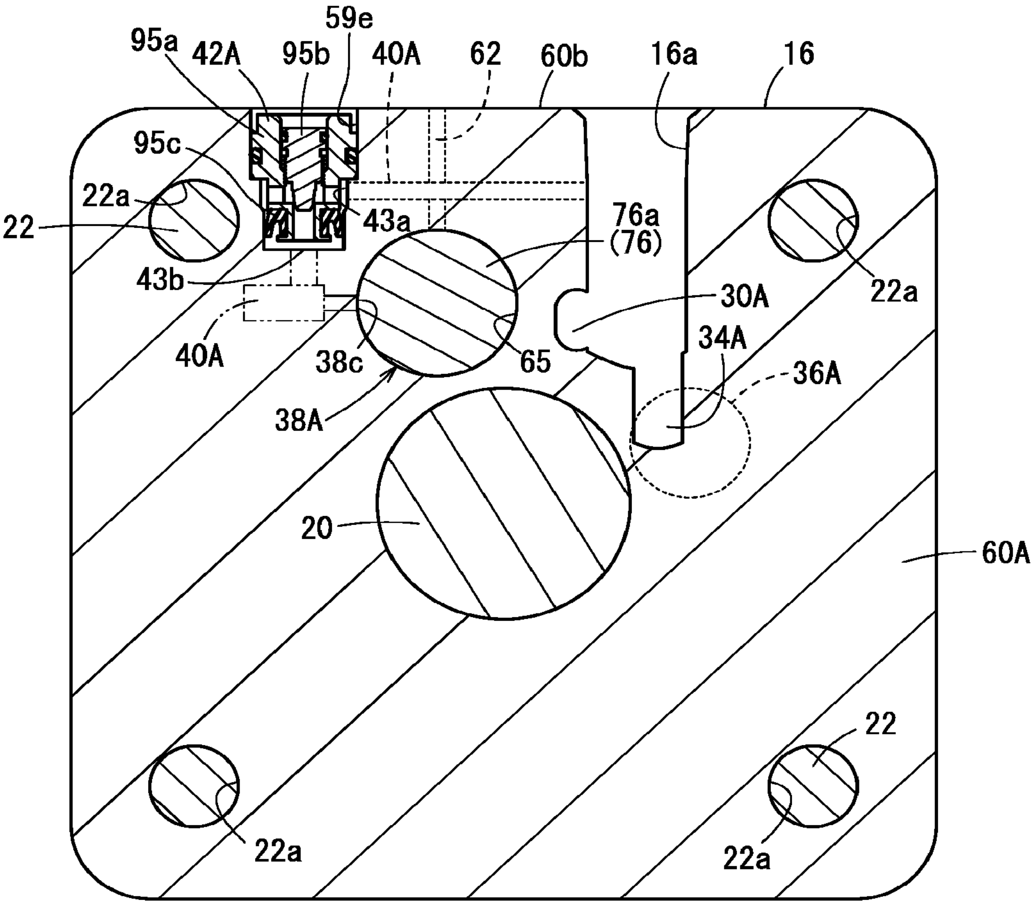
FIG. 8 is a cross-sectional view taken along line VIII-VIII of FIG. 4.

As shown in FIGS. 7 and 8, the third flow path 34A opens on a lower end of the rod side port 16*a*, extends toward the inner end surface 60*c* of the main body portion 60A, and is connected to the check valve 36A. The check valve 36A is inserted into the valve hole 59*a* that opens on the inner end surface 60*c*, and includes a valve element 90, a supporting body 86 that is fitted into the valve hole 59*a* and thereby supports the valve element 90, and a spring 88 connecting the valve element 90 and the supporting body 86. An inlet 90*a* having a reduced diameter is formed on a rear side of the valve hole 59*a*, and the valve element 90 is arranged so as to close the inlet 90*a*. The spring 88 is arranged between the valve element 90 and the supporting body 86, and biases the valve element 90 toward the inlet 90*a* side. The air flowing from the inlet 90*a* side flows into the valve hole 59*a* by pressing the valve element 90 toward the supporting body 86 side against the biasing force of the spring 88, and flows via an opening 86*a* into the rod side pressure chamber 12*b*. In the case that the pressure on the side of the rod side pressure chamber 12*b* is high, since the valve element 90 is pressed against the inlet 90*a*, the check valve 36A prevents the exhaust air of the rod side pressure chamber 12*b* from passing.

As shown in FIG. 8, the pilot air flow path 40A extends from the rod side port 16*a* toward an inlet 43*a* of the third flow rate adjustment part 42A, and is connected via the third flow rate adjustment part 42A to the pilot port 38*c*. The third flow rate adjustment part 42A is disposed in a valve hole 59*e* that opens on the upper surface 60*b* and communicates with the pilot air flow path 40A. The third flow rate adjustment part 42A is a check valve equipped throttle valve, and includes a flow path member 95*a* constituting an inner side flow path and an outer side flow path, a needle 95*b* capable of variably adjusting the cross-sectional area of the inner side flow path, and a seal member 95*c* provided in the outer side flow path. The seal member 95*c* is an elastic member having a substantially V-shaped cross section with a concave portion directed toward an outlet 43*b*, and prevents the passage of air flowing in a reverse direction from the outlet 43*b* toward the inlet 43*a* in the outer side flow path.

Figure 5:
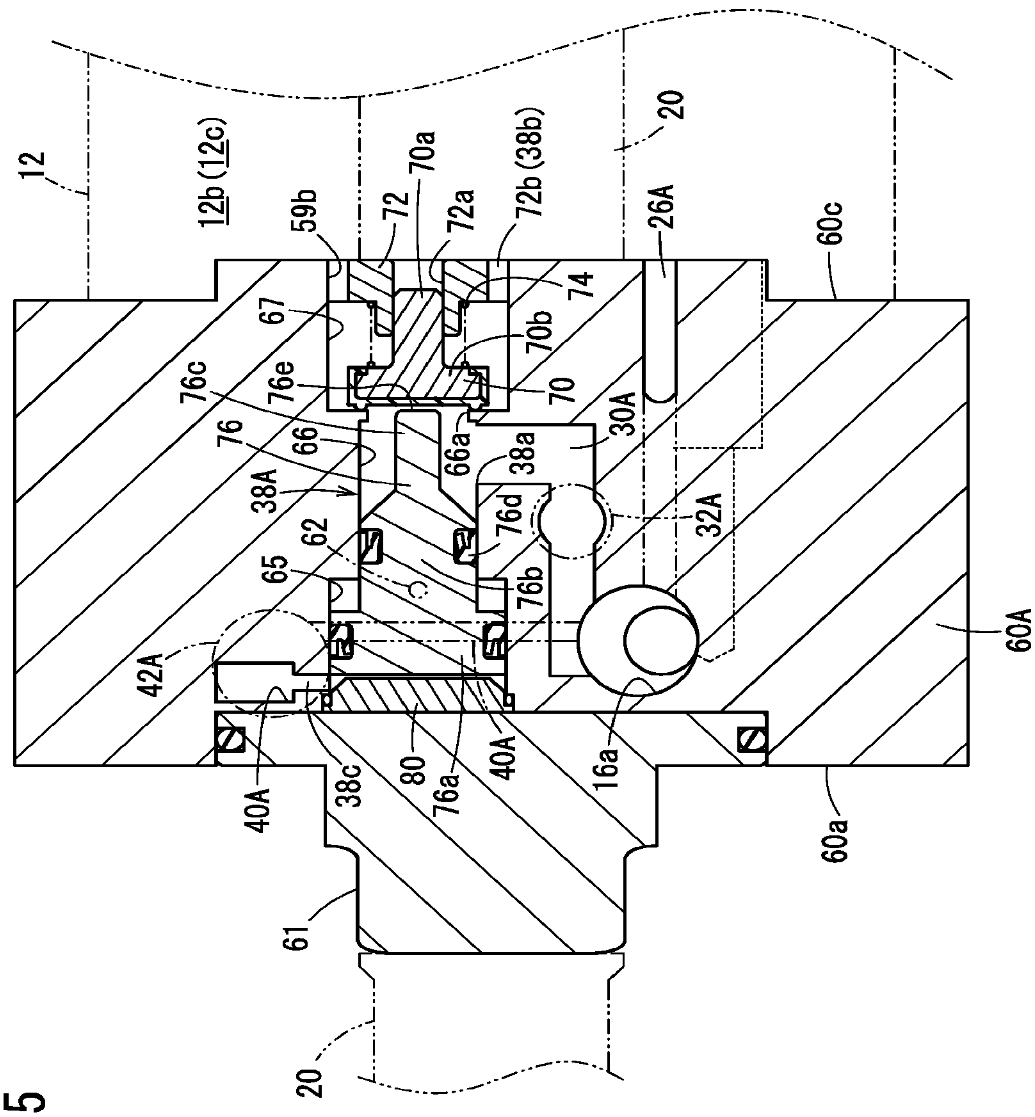
FIG. 5 is a cross-sectional view taken along line V-V of FIG. 3B.

As shown in FIG. 5, one end of the pilot air flow path 40A communicates with the pilot port 38*c* of the pilot check valve 38A. The pilot check valve 38A is provided in the valve hole 59*b* that is formed by penetrating through the main body portion 60A in the axial direction and has a circular cross section. The valve hole 59*b* includes a piston chamber 65 formed on the outer end surface 60*a* side, a check valve accommodating portion 67 formed on the inner end surface 60*c* side, and an intermediate portion 66 formed between the piston chamber 65 and the check valve accommodating portion 67. An end part of the piston chamber 65 on the outer end surface 60*a* side is sealed by a cap 80. The pilot air flow path 40A opens as the pilot port 38*c* in the piston chamber 65 in the vicinity of the cap 80. An air vent hole 62 opens in the vicinity of an end part of the piston chamber 65 on the inner end surface 60*c* side. The air vent hole 62 opens on the upper surface 60*b* of the main body portion 60A.

The intermediate portion 66 is formed with an inner diameter that is smaller than that of the piston chamber 65 and the check valve accommodating portion 67, and includes, at a boundary portion between the intermediate portion 66 and the check valve accommodating portion 67, a reduced diameter portion 66*a* formed by reducing the diameter of the intermediate portion 66. A pilot piston 76 is arranged in the piston chamber 65 and the intermediate portion 66. The pilot piston 76 includes a piston member 76*a* that slides inside the piston chamber 65. The piston member 76*a* partitions the piston chamber 65 into a portion communicating with the pilot air flow path 40A and a portion communicating with the air vent hole 62, and receives the pressure of the pilot air from the pilot air flow path 40A to generate a driving force in a rightward direction as shown in the drawing. When the pressure of the pilot air increases, the pilot piston 76 projects toward the inner end surface 60*c* side as shown in FIG. 6.

As shown in FIG. 5, a guide member 76*b* is formed to project from the piston member 76*a* toward the intermediate portion 66 side. The guide member 76*b* is formed with a diameter that is slightly smaller than the inner diameter of the intermediate portion 66, and slides along the intermediate portion 66. A packing 76*d* in order to prevent leakage of air is provided on an outer circumferential part of the guide member 76*b*. A rod member 76*c* extends from an end part of the guide member 76*b* on the check valve accommodating portion 67 side. The rod member 76*c* is formed with a diameter that is smaller than that of the reduced diameter portion 66*a* of the intermediate portion 66, and is separated from the inner circumferential surfaces of the intermediate portion 66 and the reduced diameter portion 66*a*.

A valve element 70, a supporting body 72 that supports the valve element 70, and a return spring 74 that biases the valve element 70 are provided in the check valve accommodating portion 67. The supporting body 72 is fitted into an end part of the check valve accommodating portion 67 on the inner end surface 60*c* side. A cylindrical shaft hole 72*a* is provided in a central portion of the supporting body 72, and a shaft portion 70*a* of the valve element 70 is inserted into the shaft hole 72*a*. Further, an opening 72*b* is provided on an outer circumferential portion of the supporting body 72, and an inner side of the check valve accommodating portion 67 and the rod side pressure chamber 12*b* are capable of communicating through the opening 72*b*. The valve element 70 includes a closing portion 70*b* which is a portion thereof that faces the reduced diameter portion 66*a* and is enlarged in diameter in a disk-like shape, and the shaft portion 70*a* extends from the closing portion 70*b* toward the supporting body 72 side. The closing portion 70*b* is biased by the return spring 74 toward the reduced diameter portion 66*a* side, and the closing portion 70*b* covers and closes the reduced diameter portion 66*a*.

In a state in which the pressure of the pilot air is not acting, as shown in the drawing, the pilot piston 76 of the pilot check valve 38A is biased toward the cap 80 side by the elastic force of the return spring 74. In such a state, when the high pressure air flows in from the intermediate portion 66, since the closing portion 70*b* is pressed by the high pressure air, the valve element 70 is separated away from the reduced diameter portion 66*a* and then allows passage of the air flowing toward the rod side pressure chamber 12*b* through the second flow path 30A. On the other hand, when the pressure of the exhaust air in the rod side pressure chamber 12*b* increases, the closing portion 70*b* is biased toward the reduced diameter portion 66*a* side, and therefore, the valve element 70 prevents the exhaust air from passing.

Further, as shown in FIG. 6, when the pressure of the pilot air is greater than or equal to the predetermined value, the pilot piston 76 is displaced toward the check valve accommodating portion 67 side. In such a state, by the rod member 76*c* of the pilot piston 76 projecting toward the check valve accommodating portion 67 side, the closing portion 70*b* of the valve element 70 is retained in a state of being separated away from the reduced diameter portion 66*a*. Therefore, the pilot check valve 38A allows the air to pass not only in a direction from the inlet 38*a* toward the outlet 38*b*, but also in a direction opposite thereto.

Figure 10A:
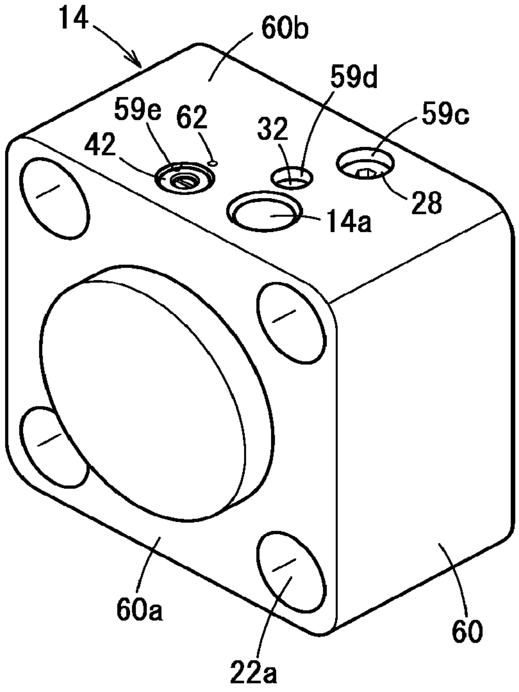
FIG. 10A is a perspective view of a head cover shown in FIG. 1.

The rod cover 16 is configured in the manner described above, and hereinafter, a description will be given concerning the head cover 14. As shown in FIG. 10A, the head cover 14 is equipped with a rectangular parallelepiped shaped main body portion 60 that is flat in the axial direction. The connecting holes 22*a* open on an outer end surface 60*a* of the main body portion 60. Further, the head side port 14*a*, the first flow rate adjustment part 28, the second flow rate adjustment part 32, and the third flow rate adjustment part 42 are exposed on an upper surface 60*b* of the main body portion 60, and an air vent hole 62 opens thereon.

Figure 10B:
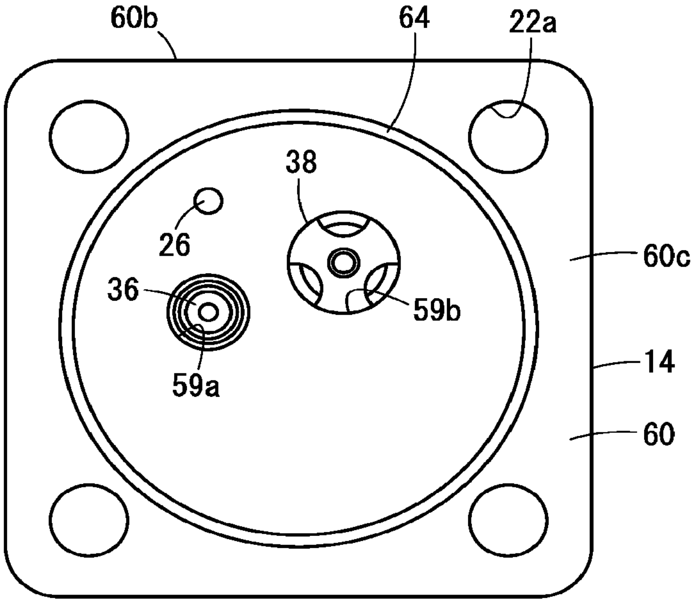
FIG. 10B is a side view of a cylinder tube side of the head cover shown in FIG. 10A.

As shown in FIG. 10B, a cylinder tube mounting groove 64 is formed on an inner end surface 60*c* of the main body portion 60, and openings of the check valve 36, the pilot check valve 38, and the first flow path 26 are provided on the inner side thereof.

Figure 11:
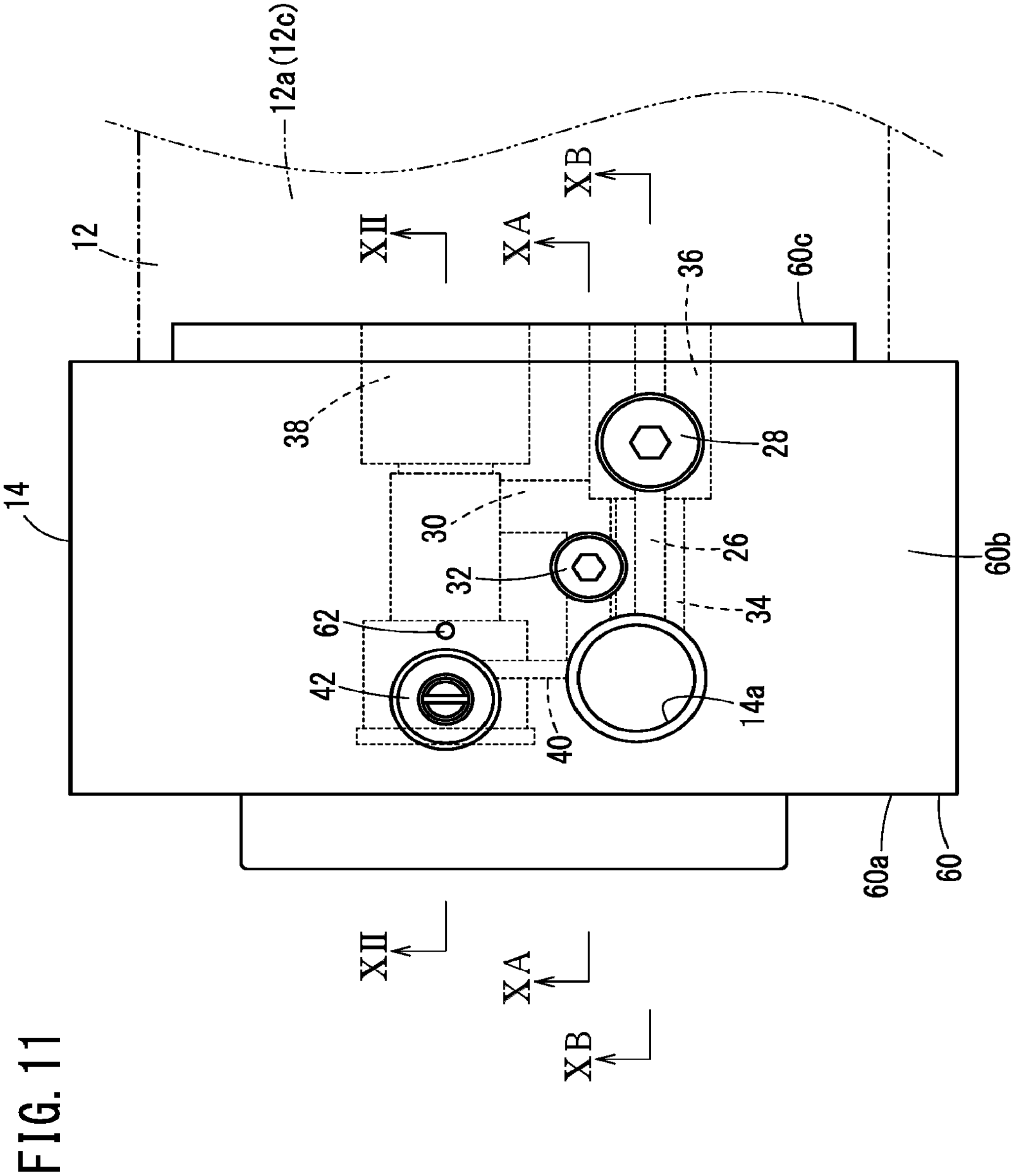
FIG. 11 is a plan view of the head cover shown in FIG. 10A.

As shown in FIG. 11, in the head cover 14, the pilot check valve 38 is disposed close to the center of the main body portion 60 of the head cover 14, and the third flow rate adjustment part 42 is arranged in an overlapping manner with the upper surface 601 side of the pilot check valve 38, Consequently, the pathway of the pilot air flow path 40 is made simpler in structure, Note that the cross-sectional shapes along the line XB-XB of the first flow path 26, the third flow path 34, the first flow rate adjustment part 28, and the check valve 36 are the same as the cross-sectional shapes of the first flow path 26A, the third flow path 34A, the first flow rate adjustment part 28A, and the check valve 36A of the rod cover 16 shown in FIG. 7. Further, the cross-sectional shapes along the line XA-XA of FIG. 11 of the second flow path 30 and the second flow rate adjustment part 32 are the same as the cross sectional shapes shown in FIG. 9.

Figure 12:
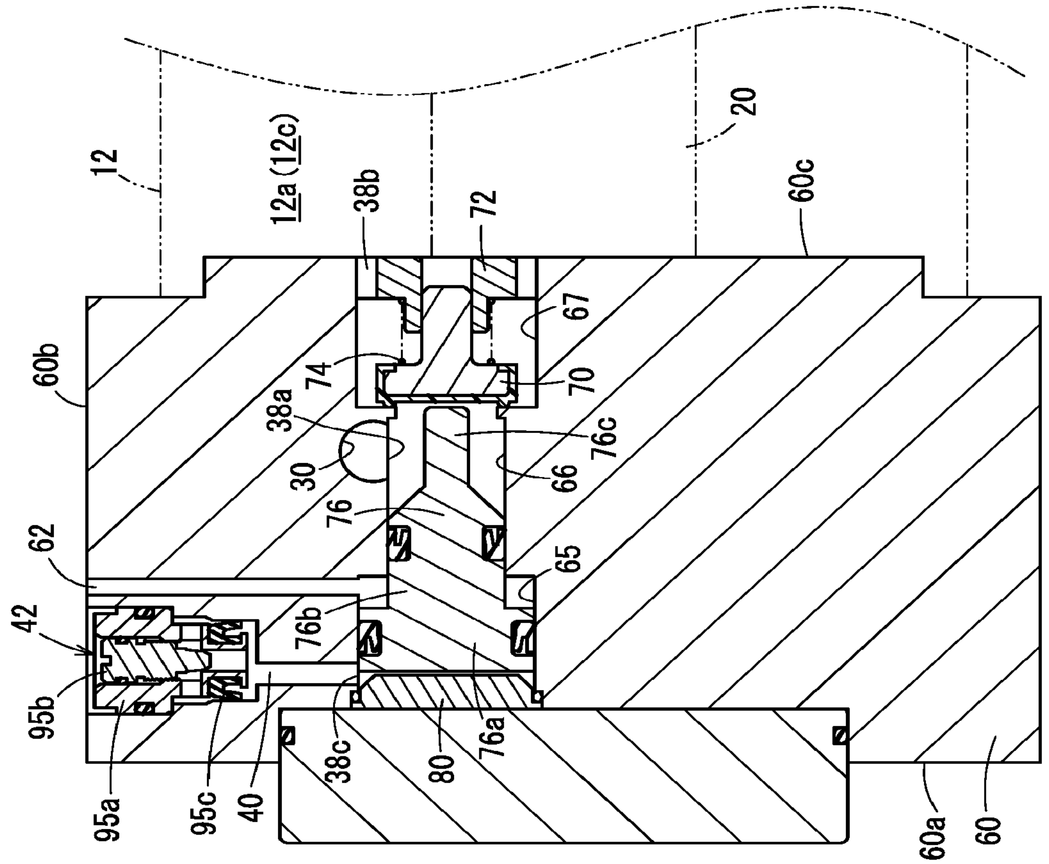
FIG. 12 is a cross-sectional view taken along line XII-XII of FIG. 11.

As shown in FIG. 12, the layout of the head cover 14 differs from the layout of the rod cover 16 in that the pilot air flow path 40 opens on the upper end of the piston chamber 65, and the second flow path 30 opens on the upper end of the intermediate portion 66. The other structural features of the pilot check valve 38 that is formed in the head cover 14 are the same as those of the pilot check valve 38A shown in FIG. 5, and since the same structural elements thereof are designated by the same reference numerals, detailed description of such features is omitted herein.

The air cylinder 10, the head cover 14, and the rod cover 16 according to the present embodiment are configured in the manner described above. Hereinafter, a description will be given concerning operations and actions thereof.

As shown in FIG. 2, at a time when the air cylinder 10 is used, a drive device 50 is connected thereto, which includes a high pressure air supply source 52, exhaust ports 54, and an operation switching valve 56 that connects the high pressure air supply source 52 and the exhaust port 54 to the head side port 14*a* and the rod side port 16*a* in a switchable manner. The operation switching valve 56 is a 5-port valve that is switched electrically, and includes first through fifth ports 56*a* to 56*e*. The first port 56*a* is connected to the head side port 14*a*, and the second port 56*b* is connected to the rod side port 16*a*. Further, the third port 56*c* and the fifth port 56*e* are connected to the exhaust ports 54, and the fourth port 56*d* is connected to the high pressure air supply source 52. In a first position shown in FIG. 2, in the operation switching valve 56, by placing the first port 56*a* and the fourth port 56*d* in communication with each other, and placing the second port 56*b* and the fifth port 56*e* in communication with each other, the high pressure air supply source 52 is connected to the head side port 14*a*, the exhaust port 54 is connected to the rod side port 16*a*, and the piston 18 performs an operating stroke.

As shown by the arrow A, the high pressure air from the high pressure air supply source 52 flows from the head side port 14*a* to the head side flow rate controller 24. In the head side flow rate controller 24, the high pressure air flows to the head side pressure chamber 12*a* through the first flow path 26, the second flow path 30, and the third flow path 34. In this case, as shown by the arrow A, the high pressure air is supplied to the head side pressure chamber 12*a* in a free flowing manner through the third flow path 34 and the check valve 36, without passing through the throttle valve.

Further, the pilot air is supplied from the pilot port 38*c* of the pilot check valve 38 through the pilot air flow path 40 and the check valve 42*b* of the third flow rate adjustment part 42. Consequently, as shown in FIG. 6, in the pilot check valve 38 on the head side, the rod member 76*c* of the pilot piston 76 projects toward the check valve accommodating portion 67 side, and allows flow in both directions.

Accompanying the operating stroke of the piston 18, as shown by the arrow B, the exhaust air from the rod side pressure chamber 12*b* is discharged through the rod side flow rate controller 24A. Since the check valve 36A does not allow the exhaust air to pass, as shown by the arrow B1, the exhaust air is discharged through the first flow path 26A, and as shown by the arrow B2, the exhaust air is discharged through the second flow path 30A. Until the middle of the operating stroke, the pilot check valve 38A of the second flow path 30A maintains the pressure of the pilot air that was accumulated in the piston chamber 65 in the previous return stroke. Therefore, as shown in FIG. 6, since the pilot piston

76 continues to cause the valve element 70 to separate away from the reduced diameter portion 66*a*, the pilot check valve 38A allows the exhaust air to pass. Therefore, in FIG. 2, as shown by the arrow B1+B2, the exhaust air is discharged at a predetermined flow rate (first control flow) through the first flow path 26A and the second flow path 30A. The operating speed of the piston 18 is limited due to the flow rate of the exhaust air.

Further, in the operating stroke, as shown by the arrow C2, the pilot air of the pilot check valve 38A gradually flows out through the pilot air flow path 40A and the third flow rate adjustment part 42A. Accompanying outward flowing of the pilot air, the pressure of the pilot air in the pilot check valve 38A gradually decreases.

Figure 13:
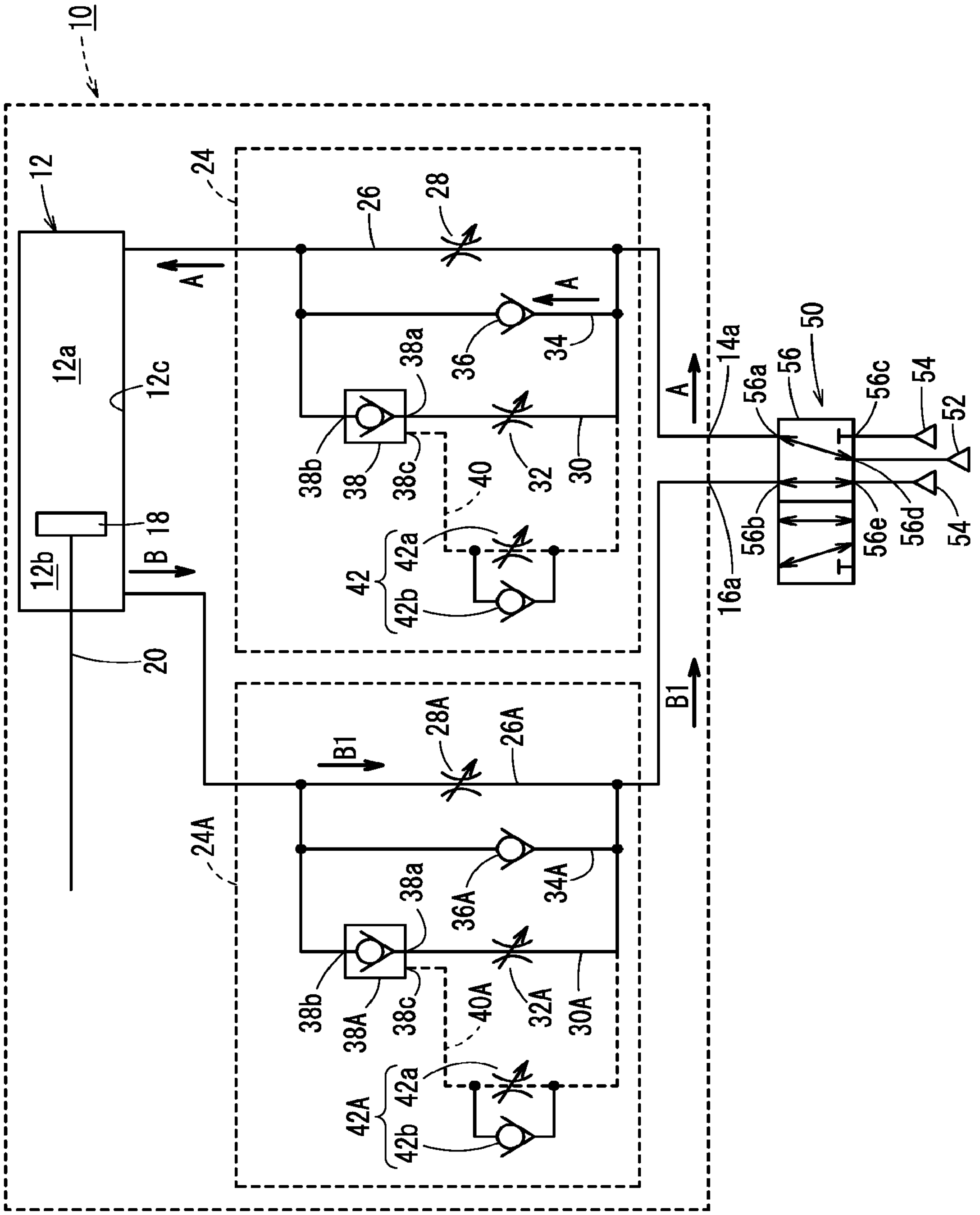
FIG. 13 is a fluid circuit diagram showing an operation in the vicinity of a stroke end of the air cylinder shown in FIG. 1.

Then, at a predetermined timing when the piston 18 approaches the stroke end, the pilot piston 76 of the pilot check valve 38A returns to the initial position as shown in FIG. 5, and the reduced diameter portion 66*a* is closed by the valve element 70. Consequently, as shown by the arrow B1 in FIG. 13, the exhaust air is switched to a second control flow of flowing through the first flow path 26A. During the second control flow, since the flow rate of the exhaust air is further throttled by the first flow rate adjustment part 28A than in the first control flow, the operating speed of the piston 18 is restricted. Consequently, an impact at the stroke end of the piston 18 can be suppressed.

Thereafter, the operation switching valve 56 is switched from the first position to the second position, whereby the high pressure air supply source 52 is connected to the rod side port 16*a*, the exhaust port 54 is connected to the head side port 14*a*, and a return stroke is initiated. The operations in the return stroke simply involve a switching of places in the operating stroke between the head side flow rate controller 24 and the rod side flow rate controller 24A, and since the operations in the return stroke and the operations in the operating stroke are substantially the same, a description of such operations will be omitted.

The air cylinder 10, the head cover 14, and the rod cover 16 of the present embodiment realize the following advantageous effects.

The air cylinder 10 according to the present embodiment is equipped with the cylinder tube 12 in which the cylinder chamber 12*c* is formed, the head cover 14 that closes one end of the cylinder tube 12, the rod cover 16 that closes the other end of the cylinder tube 12, the piston 18 that slides in the cylinder chamber 12*c*, the piston rod 20 having one end connected to the piston 18, the ports 14*a* and 16*a* provided respectively in the head cover 14 and the rod cover 16, and the flow rate controller 24 incorporated into at least one of the head cover 14 or the rod cover 16, wherein the flow rate controller 24 includes the first flow paths 26 and 26A that allow communication between the ports 14*a* and 16*a* and the cylinder chamber 12*c*, the first flow rate adjustment parts 28 and 28A disposed in the first flow paths 26 and 26A, the second flow paths 30 and 30A disposed in parallel with the first flow paths 26 and 26A, the second flow rate adjustment parts 32 and 32A disposed in the second flow paths 30 and 30A, the pilot check valves 38 and 38A disposed in series with the second flow rate adjustment parts 32 and 32A in the second flow paths 30 and 30A, and the third flow rate adjustment parts 42 and 42A that supply and discharge pilot air to and from the pilot check valves 38 and 38A, and wherein, depending on the pressure of the pilot air, the pilot check valves 38 and 38A switch between a state allowing passage of the exhaust air discharged from the cylinder chamber 12*c*, and a state preventing the passage of the exhaust air.

According to the above-described configuration, since the pilot check valves 38 and 38A, which are of a simple structure, are used in order to switch the control flow of the exhaust air, a switching valve in which a shuttle valve or a three-way valve is used becomes unnecessary, and the internal structure is simplified. Further, since constituent members, for which precision is required, such as sleeves and spools that constitute a shuttle valve or a three-way valve are rendered unnecessary, grinding or polishing and surface treatment requiring a number of production steps are rendered unnecessary, and manufacturing can be carried out at a low cost.

The above-described air cylinder 10 may further comprise the check valves 36 and 36A that are disposed in parallel with the first flow rate adjustment parts 28 and 28A, and allow passage of air flowing from the ports 14*a* and 16*a* toward the cylinder chamber 12*c*. In accordance with such a configuration, the high pressure air can be supplied to the cylinder chamber 12*c* in a free flowing manner, and the air cylinder 10 can be operated at high speed.

In the above-described air cylinder 10, the third flow rate adjustment parts 42 and 42A may be equipped with the throttle valve 42*a*, and the check valve 42*b* that is disposed in parallel with the throttle valve 42*a* and allows passage of air flowing toward the pilot port 38*c*.

The head cover 14 according to the present embodiment is the head cover 14 for the air cylinder 10 that covers a head side end part of the cylinder tube 12, the head cover comprising the head side port 14*a*, the first flow path 26 that communicates with the head side port 14*a* and the cylinder chamber 12*c* of the air cylinder 10, the first flow rate adjustment part 28 disposed in the first flow path 26, the second flow path 30 disposed in parallel with the first flow path 26, the second flow rate adjustment part 32 disposed in the second flow path 30, the pilot check valve 38 disposed in the second flow path 30, and connected in series with the second flow rate adjustment part 32, and the third flow rate adjustment part 42 that supplies and discharges the pilot air to and from the pilot check valve 38, wherein, depending on the pressure of the pilot air, the pilot check valve 38 switches between a state allowing passage of the exhaust air discharged from the cylinder chamber 12*c*, and a state preventing the passage of the exhaust air.

The rod cover 16 according to the present embodiment is the rod cover 16 for the air cylinder 10 that covers a rod side end part of the cylinder tube 12, the rod cover comprising the rod side port 16*a*, the first flow path 26A that communicates with the rod side port 16*a* and the cylinder chamber 12*c* of the air cylinder 10, the first flow rate adjustment part 28A disposed in the first flow path 26A, the second flow path 30A disposed in parallel with the first flow path 26A, the second flow rate adjustment part 32A disposed in the second flow path 30A, the pilot check valve 38A disposed in the second flow path 30A, and connected in series with the second flow rate adjustment part 32A, and the third flow rate adjustment part 42A that supplies and discharges the pilot air to and from the pilot check valve 38A, wherein, depending on the pressure of the pilot air, the pilot check valve 38A switches between a state allowing passage of the exhaust air discharged from the cylinder chamber 12*c*, and a state preventing the passage of the exhaust air.

According to the head cover 14 and the rod cover 16 described above, since the pilot check valves 38 and 38A, which are of a simple structure, are used in order to switch the control flow of the exhaust air, a switching valve in which a shuttle valve or a three-way valve is used becomes unnecessary, the internal structure is simplified, and manufacturing can be carried out at a low cost.

Although a description of a preferred embodiment of the present invention has been presented above, it should be understood that the present invention is not limited to the above-described embodiment, and various changes and modifications may be made within a range that does not deviate from the essence and gist of the present invention.

The invention claimed is:

1. An air cylinder, comprising:

a cylinder tube in which a cylinder chamber is formed;

a head cover configured to close one end of the cylinder tube;

a rod cover configured to close another end of the cylinder tube;

a piston configured to slide in the cylinder chamber;

a piston rod having one end connected to the piston;

a port provided in each of the head cover and the rod cover; and a flow rate controller incorporated into at least one of the head cover or the rod cover, wherein the flow rate controller includes:

a first flow path configured to allow communication between the port and the cylinder chamber;

a first flow rate control valve disposed in the first flow path;

a second flow path disposed in parallel with the first flow path;

a second flow rate control valve disposed in the second flow path;

a pilot check valve disposed in series with the second flow rate control valve in the second flow path;

a pilot air flow path, one end of which with the first flow path between the first flow rate control valve and the port, and with the second flow path between the second flow rate control valve and the port, and another end of which is connected to a pilot port of the pilot check valve; and a third flow rate control valve disposed midway along the pilot air flow path and configured to supply and discharge pilot air to and from the pilot check valve, and wherein, depending on a pressure of the pilot air, the pilot check valve switches between a state allowing passage of exhaust air discharged from the cylinder chamber, and a state preventing the passage of the exhaust air.

2. The air cylinder according to claim 1, further comprising a check valve disposed in parallel with the first flow rate control valve, and configured to allow passage of air flowing from the port toward the cylinder chamber.

3. The air cylinder according to claim 1, wherein the third flow rate control valve includes a throttle valve, and a check valve disposed in parallel with the throttle valve, the check valve being configured to allow passage of air flowing toward the pilot check valve.

4. A head cover for an air cylinder that covers a head side end part of a cylinder tube, the head cover comprising:

a port;

a first flow path configured to communicate with the port and a cylinder chamber of the air cylinder;

a first flow rate control valve disposed in the first flow path;

a second flow path disposed in parallel with the first flow path;

a second flow rate control valve disposed in the second flow path;

a pilot check valve disposed in the second flow path, and connected in series with the second flow rate control valve;

a pilot air flow path, one end of which communicates with the first flow path between the first flow rate control valve and the port, and with the second flow path between the second flow rate control valve and the port and another end of which is connected to a pilot port of the pilot check valve; and a third flow rate control valve disposed midway along the pilot air flow path and configured to supply and discharge pilot air to and from the pilot check valve, wherein, depending; on a pressure of the pilot air, the pilot check valve switches between a stale allowing passage of exhaust air discharged from the cylinder chamber, and a state preventing the passage of the exhaust air.

5. The air cylinder according to claim 1, wherein the first flow path and the second flow path are open on a surface of the head cover or the rod cover, the surface facing the cylinder chamber, each of the first flow path and the second flow path includes a hole extending in an axial direction of the cylinder tube, and the hole of the first flow path and the hole of the second flow path communicate with the cylinder chamber without merging with each other.

6. A rod cover for an air cylinder that covers a rod side end part of a cylinder tube, the rod cover comprising:

a port;

a first flow path configured to communicate with the port and a cylinder chamber of the air cylinder;

a first flow rate control valve disposed in the first flow path;

a second flow path disposed in parallel with the first flow path;

a second flow rate control valve disposed in the second flow path;

a pilot check valve disposed in the second flow path, and connected in series with the second flow rate adjustment part;

a pilot air flow path, one end of which communicates with the first flow path between the first flow rate control valve and the port, and with the second flow path between the second flow rate control valve and the port, and another end of which is connected to a pilot port of the pilot check valve; and a third flow rate control valve disposed midway along the pilot air flow path and configured to supply and discharge pilot air to and from the pilot check valve, wherein, depending on a pressure of the pilot air, the pilot check valve switches between a state allowing passage of exhaust air discharged from the cylinder chamber, and a state preventing the passage of the exhaust air.

* * * * *